United States Patent Office 3,397,919
Patented Aug. 20, 1968

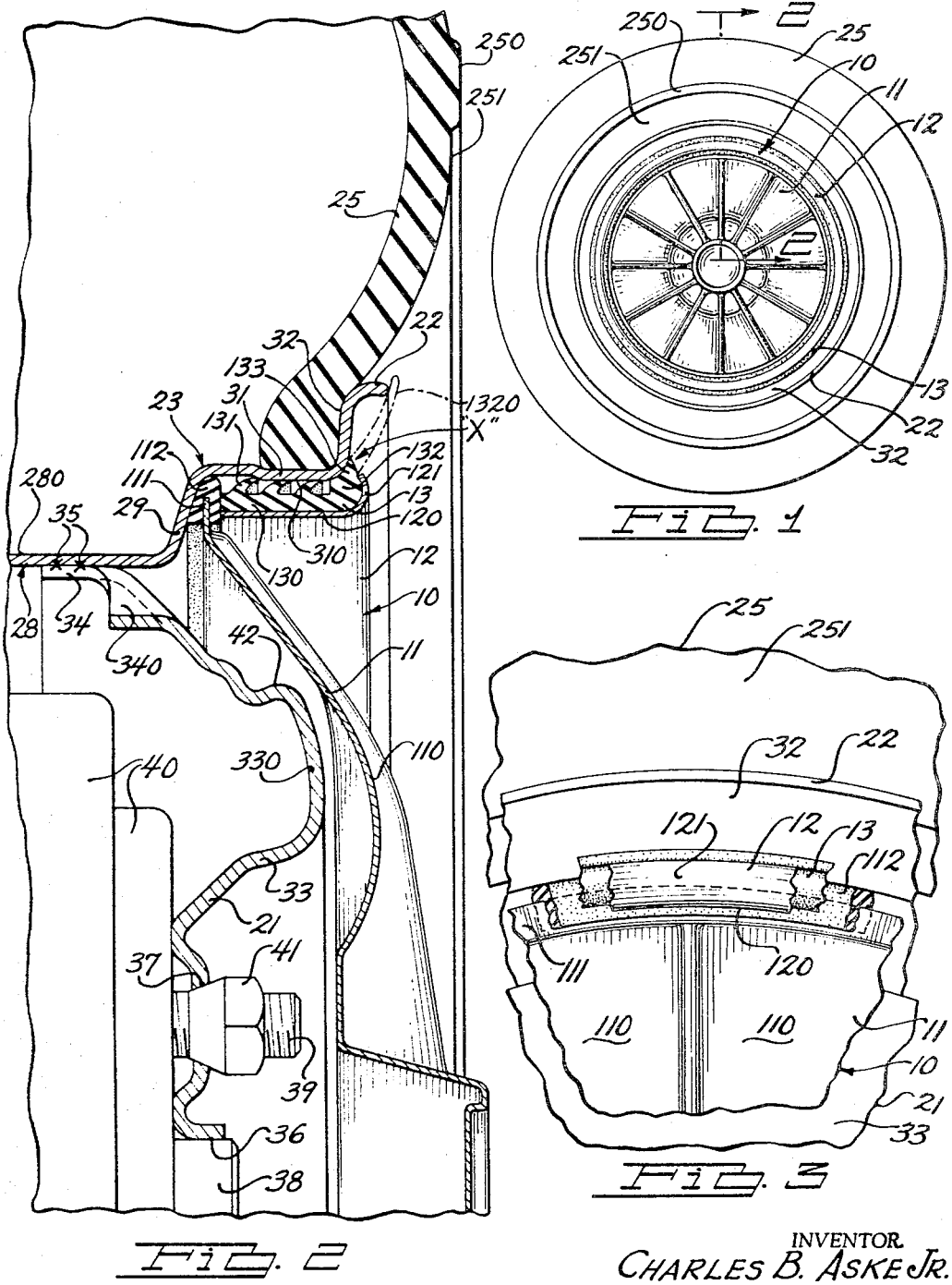

3,397,919
VEHICLE WHEEL TRIM
Charles B. Aske, Jr., Birmingham, Mich., assignor, by direct and mesne assignments, to Gar Wood Industries, Inc., a corporation of Michigan
Continuation-in-part of application Ser. No. 502,180, Oct. 22, 1965. This application Aug. 7, 1967, Ser. No. 658,847
1 Claim. (Cl. 301—37)

ABSTRACT OF THE DISCLOSURE

A vehicle wheel trim construction for conventional drop center rim type vehicle wheels consisting of a plastic or metal wheel cover element and a plastic or metal rim trim wherein the said wheel cover includes a resilient annular locator and cushioning flange disposed around the outer periphery thereof formed and sized to locate the said wheel cover element concentrically within the tire bead seat annulus of the said drop center rim and in abutment against the outer side wall of the said drop center rim, and wherein the said rim trim element includes a resilient means removably securing the same to a vehicle wheel within the tire bead seat annulus thereof in axially abutting annular contact firmly against the resilient locator and cushioning flange of the wheel cover element, the said rim trim element and its resilient securing means providing the sole means for securing itself and the wheel cover element on said vehicle wheel with the metal or plastic parts disposed in cushioned relationship with respect to each other and the vehicle wheel.

---

This invention relates to improvements in vehicle wheel trim, and in particular to extremely economical wheel cover and rim trim construction of the type that may be readily and firmly mounted on a vehicle wheel and conveniently removed therefrom without damage to the wheel cover element and rim trim element or to the finish of the vehicle wheel, and is a continuation-in-part of co-pending application, Ser. No. 502,180, filed Oct. 22, 1965, now Patent No. 3,367,720, entitled Vehicle Wheel Trim.

The primary object of the invention is to provide an improved wheel trim construction for automotive vehicle wheels employing a wheel cover element having a resilient locator and cushioning flange disposed around the outer periphery thereof to position the wheel cover element in concentric cushioned relationship within the tire bead seat annulus of the vehicle wheel, and a rim trim element including a resilient anchorage means disposed therearound removably securing said rim trim element in cushioned relationship to the tire bead seat annulus of the vehicle wheel, the said rim trim element and its resilient anchorage means being the sole means for securing said wheel cover element and its locator and cushioning flange firmly axially on said vehicle wheel within the tire bead seat annulus thereof while permitting the said locator flange on said wheel cover element to maintain concentricity of said wheel cover element within said tire bead seat annulus of said vehicle wheel.

A further object of the invention is to provide a vehicle wheel trim construction consisting of two cooperating elements; one, a wheel cover element having a locator flange therearound positionable in cushioned relationship concentrically within the tire bead seat annulus and against the outer side wall of the vehicle wheel rim, and the other, a rim trim element including preferably toothed resilient anchorage means therearound removably securing said wheel trim element axially within the tire bead seat of said vehicle wheel and serving as the sole means for removably securing said wheel cover element on said vehicle wheel.

Other objects of the invention will become apparent by reference to the following detailed description taken in connection with the accompanying drawings, in which:

FIG. 1 is a side elevational view of a vehicle wheel and tire having mounted thereon a vehicle wheel cover and rim trim construction embodying the invention.

FIG. 2 is an enlarged fragmentary sectional view taken on the line 2—2 of FIG. 1.

FIG. 3 is an enlarged fragmentary elevational view with parts broken away showing the wheel cover and rim trim disclosed in FIGS. 1 and 2.

Referring now to the drawings wherein like reference characters refer to like and corresponding parts throughout the several views, the particular embodiment of wheel trim construction 10 of the invention disclosed for illustrative purposes consists of a wheel cover element 11 having a radially disposed peripheral flange 111 therearound over which is assembled a resilient locator and cushioning flange 112, and an axially disposed annular rim trim element 12 including a resilient annular anchorage means 13 assembled aroud the outer periphery thereof removably securing said rim trim element in cushioned relationship to and within the tire bead seat annulus 310 of the tire bead seat 31 of the vehicle wheel 21, the said rim trim element and its resilient anchorage means 13 being the sole means for securing the said wheel cover element 11 and its peripheral locator flange 111 firmly axially on said vehicle wheel 21 while permitting the said wheel cover element 11 and its locator and cushioning flange 111 to maintain reasonably accurate concentricity within the tire bead seat annulus 310 of the tire bead seat 31 of said vehicle wheel 21.

The vehicle wheel 21 is of a conventional type and is shown in the drawings with a tubeless tire 25 mounted thereon. The said vehicle wheel 21 has the usual drop center rim 23 composed of a central channel or drop center 28 having side walls 29 and a base 280. An annular tire bead seat 31 extends laterally outwardly from each side of the side walls 29 of the drop center 28. Each said tire bead seat 31 terminates in a tire bead seat flange 32 extending radially therefrom and which is axially outwardly curved at its upper portion to form an axially disposed outer lip 22. The said tire bead seat flange 32 is ofttimes referred to as the wheel flange and the said lip 22 is ofttimes referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is usually formed with an annular axially outwardly extending reinforcing collar 330 which is generally provided with a plurality of hub cap retainer nubs 42 over which a conventional hub cap (not shown) is normally sprung for securement onto the vehicle wheel 21. However, because the wheel trim assembly of the invention covers substantially the entire wheel, no hub cap is used when a vehicle wheel is trimmed with wheel trim of the instant invention. The vehicle wheel manufacturer nevertheless paints the vehicle wheels 21 in a conventional manner so that the purchaser of the motor vehicle may have a choice of available wheel trim.

The particular tire 25 illustrated in the drawings is a modern tubeless tire having a scuff bead 250 extending from its side wall 251. The said tubeless tire 25, when used on the vehicle wheel 21, requires a conventional valve stem (not shown) mounted in sealed relationship through a suitable valve stem aperture (not shown) generally provided in the outer side wall 29 of the drop center rim channel 28 of the rim 23 of the said wheel 21. The wheel trim 10 of the invention is also suitably slotted or apertured (not shown) to accommodate the said valve stem so that it is always available for inflation or deflation of the tire.

The wheel trim construction 10 of the invention consists of two cooperating major elements or sub-assemblies; namely, a generally disc or dome shaped relatively rigid wheel cover element 11 including a radially extending circumferential locator flange 112 therearound and a generally axially disposed annular rim trim element 12 including a generally axially disposed annular toothed anchorage means 13 disposed therearound, the said rim trim element 12 including its anchorage element 13 being the sole means for axially removably securing the vehicle wheel construction 10 on the vehicle wheel.

The wheel cover element 11 is preferably formed of stainless steel or formed or molded of a relatively rigid yet not brittle plastic and includes an axially outwardly facing central disc or domed portion 110 suitably contoured to avoid contact with the wheel spider 33 and a circumferential radially extending flange 111. The said circumferential flange 111 radially extending from the said disc or domed portion 110 of the wheel cover 11 is preferably relatively thin; for example, preferably the same thickness as the disc or domed portion 110. This permits the wheel cover element 11 to be vacuum formed or injection molded and made much thinner and lighter, and more economical than if the said wheel cover element were thicker. Furthermore, in addition to the economies present in the use of a much thinner plastic wheel cover element 11, many aesthetic shapes may be employed, such as plain bubbles, wavy formations, and simulated spoked elements employing either transparent, partially opaque, flecked or fully opaque plastic whereby to give the automotive stylist a greater range of selection of materials, colors and shapes than heretofore was available to him.

The outer peripheral portion of the circumferential radially extending flange 111 of the wheel cover element 11 is provided with an annular resilient preferably continuous slotted locator flange 112 of rubber or the like thereover which is sized to contact neatly the tire bead seat annulus 310 of the vehicle wheel rim 23 and becomes disposed axially against the side wall 29 of the rim channel 28 when the said wheel cover element 11 is positioned concentrically in cushioned relationship on a vehicle wheel 21 by inserting it axially within the said tire bead seat annulus 310 of the said vehicle wheel 21.

When the said wheel cover element 11 is axially placed on the vehicle wheel 21, the said locator flange 112 locates the said wheel cover element 11 in concentric position within the tire bead seat annulus 310 of the wheel rim 21 with the said locator flange 112 disposed against the outer side wall 29 of the wheel channel 28, where it is axially engaged and anchored by the axially disposed rim trim element 12 and its anchorage means 13 as hereinafter described.

The annular rim trim element 12 consists of an annular axially disposed band or ring portion 120 preferably of stainless steel; however, it may be formed of cold rolled steel suitably painted or otherwise finished, or it could be of plastic or polished or anodized aluminum. The band or ring portion 120 of the annular rim trim element 12 terminates in a radially disposed annular outer portion 121 which is preferably curved or bull-nosed to conform to the axially facing bead portion 132 of its anchorage element 13 which is hereinafter described in detail. Although the said annular rim trim element 12 is shown in the drawings as having a smooth surface, it may be suitably ribbed or otherwise patterned to provide desired aesthetic effects with or without a multiplicity of reflective surfaces to provide additional eye appeal to the vehicle wheel trim 10.

The annular anchorage means or element 13 assembled to the outer periphery of the rim trim element 12 is preferably formed of a rubber or synthetic rubber extrusion which is cut to the proper length and vulcanized or otherwise secured together into an annulus or ring, or, it may be molded to the desired shape. The said annular anchorage element 13 consists of a base portion 130 having a plurality, preferably three, axially spaced circumferential relatively thin integrally formed outwardly disposed flexible anchorage teeth 13, and an axially and outwardly disposed annular bead portion 132 formed with an arcuate seat at 133 to seat against the juncture of the annular tire bead seat 31 and the tire bead seat flange 32 of the drop center rim 23 of the vehicle wheel 21 when the wheel cover and rim trim assemblies 11 and 12 are sequentially mounted in cooperating relationship thereon as best shown in FIG. 2. The annular bead portion 132 of the anchorage element 13 may be provided integrally or otherwise with a suitable annular generally radially disposed extension as indicated by the dot and dash lines 1320 in FIG. 2 to provide a trim extending from the bull nose portion 121 of the rim trim element over the lip 22 of the wheel rim 23. The anchorage element 13 and/or its extended annular portion 1320 may be black or white or of any other selected color.

When the wheel cover element 11 with its resilient locator flange 112 assembled therearound is axially positioned on the vehicle wheel 21 within the tire bead seat annulus 310 thereof, the said resilient locator flange 112 is disposed neatly within the tire bead seat annulus 310 of the vehicle wheel 21 and against the side wall 29 of the wheel rim channel 28. The rim trim 12 and its anchorage element 13 which have been preassembled are then axially mounted within the tire bead seat annulus 310 of the vehicle wheel 21 with the axial inner portions of the said rim trim element 12 and anchorage element 13 disposed in firm juxtaposition with and against the said locator flange 112 of the wheel cover element 11. Thus, the wheel cover element 11 and the rim trim element 12 are removably but firmly and concentrically anchored by the anchorage element 13 on the vehicle wheel 21 in an effective unitary whole with the said rim trim 12 and its anchorage element 13 assembled thereon functioning as a cooperative unit and the sole means for axially removably securing the wheel cover element 11 on the vehicle wheel 21 while the wheel cover element is positioned concentrically and in cushioned relationship on the vehicle wheel by said resilient locator flange 112 assembled thereon.

Vehicle wheel trim of the invention is very readily mounted on and removed from the vehicle wheel by first placing the wheel cover assembly with its locator flange in position concentrically within the tire bead seat annulus of the wheel rim, and then axially fixing it in place by telescoping the rim trim element with its anchorage means in firm abutment axially against the locator flange of the wheel cover element.

It will be noted that the anchorage teeth 131 of the anchorage element 13 preferably flex axially outwardly as best shown in FIG. 2 providing the easy mounting but firm anchorage of the vehicle wheel trim 10 on the vehicle wheel 21. To remove the vehicle wheel trim 10 from the vehicle wheel 21, a gentle but firm prying of the rim trim 12 and its anchorage means progressively axially outwardly at intervals therearound is all that is required. This is accomplished by placing a screwdriver or other blunt prying device at "X" between the axially outer annular bead 132 of the annular anchorage element 13 and the juncture of the tire bead seat 31 and the tire bead seat 32 of the drop center rim, and then prying axially outwardly at relatively short intervals therearound.

Although but a single embodiment of the invention has been disclosed and described herein, it is obvious that many changes may be made in the size, shape, arrangement and detail of the several elements of the invention, all without departing from the spirit and scope thereof as defined by the appended claims.

I claim:

1. In a vehicle wheel trim for vehicle wheels of the type including a wheel spider and an annular drop center rim formed with a central annular drop center channel element including a base fixed on the periphery of said wheel spider and a generally radially and axially disposed outer side wall flange, a radially disposed tire bead seat forming a tire bead seat annulus extending axially outwardly from said channel side wall flange to a radially disposed tire bead seat flange terminating in an axially outwardly disposed annular lip, said vehicle wheel trim comprising a wheel cover assembly consisting of a generally domed wheel cover element formed in a selected aesthetic design having a radially outwardly disposed circumferential flange including a resilient U-shaped locator and cushioning flange assembled therearound sized and formed with an axially facing surface to locate said wheel cover element concentrically within the tire bead seat annulus of said vehicle wheel rim, said axially facing surface conforming to and abutting axially against the radially and axially disposed outer channel side wall flange of said drop center rim channel element, and a rim trim and anchorage assembly comprising an annular relatively rigid rim trim and a resilient rubber anchorage means assembled therearound telescoped axially within and resiliently engaging said tire bead seat annulus of said vehicle wheel axially cooperatively engaging the locator flange of said wheel cover assembly axially whereby to hold said wheel cover assembly on said vehicle wheel with said locator flange thereof disposed in firm contact against said outer side wall flange of said drop center channel element, the said rim trim and anchorage assembly being the sole means for holding said wheel cover assembly axially on said vehicle wheel.

References Cited
UNITED STATES PATENTS

| | | | |
|---|---|---|---|
| 2,812,215 | 11/1957 | Waite | 301—37 |
| 3,078,125 | 2/1963 | Aske | 301—37 |

RICHARD J. JOHNSON, *Primary Examiner.*